(12) United States Patent
Horii (10) Patent No.: US 9,497,385 B2
(45) Date of Patent: Nov. 15, 2016

(54) IMAGING DEVICE AND IMAGE DISPLAY METHOD

(71) Applicant: FUJIFILM Corporation, Tokyo (JP)

(72) Inventor: Hirofumi Horii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/878,076

(22) Filed: Oct. 8, 2015

(65) Prior Publication Data

US 2016/0028965 A1 Jan. 28, 2016

Related U.S. Application Data

(63) Continuation of application No. PCT/JP2014/061217, filed on Apr. 22, 2014.

(30) Foreign Application Priority Data

Apr. 26, 2013 (JP) .................................. 2013-094657

(51) Int. Cl.
*H04N 5/232* (2006.01)
*H04N 5/225* (2006.01)
*H04N 5/235* (2006.01)

(52) U.S. Cl.
CPC .......... *H04N 5/23293* (2013.01); *H04N 5/225* (2013.01); *H04N 5/2351* (2013.01)

(58) Field of Classification Search
CPC . H04N 5/225; H04N 5/23293; H04N 5/2351
See application file for complete search history.

(56) References Cited

U.S. PATENT DOCUMENTS

| 6,943,840 B1 * | 9/2005 | Tagawa | H04N 5/23293 348/333.01 |
| 8,964,109 B2 * | 2/2015 | Shirakawa | H04N 5/23232 348/370 |
| 2001/0015761 A1 * | 8/2001 | Yasuda | H04N 5/243 348/333.01 |
| 2004/0042791 A1 * | 3/2004 | Suekane | H04N 5/23293 396/661 |
| 2007/0052839 A1 * | 3/2007 | Kong | G03B 7/08 348/364 |

(Continued)

FOREIGN PATENT DOCUMENTS

| JP | 11-239356 A | 8/1999 |
| JP | 2001-238127 A | 8/2001 |

(Continued)

*Primary Examiner* — Amy Hsu
(74) *Attorney, Agent, or Firm* — Birch, Stewart, Kolasch & Birch, LLP (57) ABSTRACT

The imaging device includes: a first display section that functions as an electronic view finder; an illuminance detection sensor that detects an illuminance of the first display section; a display luminance detection section; a subject luminance detection section; a target luminance calculation section; and a corrected luminance calculation section. The display luminance detection section detects an actual display luminance of the first display section on the basis of a detected value of the illuminance detection sensor. The subject luminance detection section detects a subject luminance on the basis of the live view image. The target luminance calculation section calculates a target luminance on the basis of the subject luminance. The corrected luminance calculation section calculates a corrected luminance which is set in the display section in order to make the actual display luminance close to the target luminance, on the basis of the target luminance and the actual display luminance of the display section which is set to the target luminance.

12 Claims, 8 Drawing Sheets

(56) References Cited

U.S. PATENT DOCUMENTS

| | | | |
|---|---|---|---|
| 2011/0181567 A1* | 7/2011 | Tanba | G09G 5/00 345/207 |
| 2013/0083237 A1* | 4/2013 | Satou | H04N 5/2351 348/362 |
| 2015/0138252 A1* | 5/2015 | Okano | H04N 21/4318 345/690 |

FOREIGN PATENT DOCUMENTS

| | | |
|---|---|---|
| JP | 2004-38210 A | 2/2004 |
| JP | 2009-53534 A | 3/2009 |
| JP | 2009-54534 A | 3/2009 |
| JP | 2009-171167 A | 7/2009 |
| JP | 2012-165150 A | 8/2012 |

* cited by examiner

IMAGING DEVICE AND IMAGE DISPLAY METHOD

CROSS-REFERENCE TO RELATED APPLICATIONS

This application is a Continuation of PCT International Application No. PCT/JP2014/061217 filed on Apr. 22, 2014, which claims priority under 35 U.S.C §119(a) to Japanese Patent Application No. 2013-094657 filed Apr. 26, 2013. The above application is hereby expressly incorporated by reference, in its entirety, into the present application.

BACKGROUND OF THE INVENTION

1. Field of the Invention

The present invention relates to an imaging device and an image display method capable of performing live view display of an image on an electronic view finder.

2. Description Related to the Prior Art

Imaging devices such as digital cameras and digital video cameras, which obtain an image of a subject by causing an image sensor to capture the image of the subject formed by an image capture lens, have come into widespread use. Further, camera modules having an image capture lens and an image sensor are generally mounted on electronic devices such as smartphones, mobile phones, PDAs, and tablet terminals. Accordingly, the camera modules also function as imaging devices. In order to determine a photography area (composition) or perform a focusing operation, generally a view finder is provided in such various imaging devices.

As the view finder, an optical finder that has a finder optical system or an electronic view finder (EVF) that displays an electronic image has been known. The electronic view finder includes a display section that is constituted of a liquid crystal display device and the like, and causes the display section to sequentially display live view images which are captured at a predetermined frame rate and are generated on the basis of imaging signals sent from the image sensor.

Since the imaging device is driven by electric power supplied from a built-in battery, it is preferable to reduce power consumption of the electronic view finder which performs live view display. Hence, there is a known imaging device that detects brightness of the surrounding environment through the illuminance detection sensor and performs power saving driving of the electronic view finder by adjusting a display luminance of an the electronic view finder in accordance with brightness of the detected surrounding environment (JP2009-171167A) Specifically, the imaging device of JP2009-171167A decreases the luminance of the electronic view finder when a surrounding environment is bright, and increases the luminance of the electronic view finder when a surrounding environment is dark.

Although not related to the imaging device having the electronic view finder mounted thereon, there is also a known display device capable of achieving reduction in power consumption by detecting brightness (distinction between day and night) of environment through an illuminance detection sensor and adjusting a luminance and a gray scale of display in accordance with brightness of the detected surrounding environment (JP2009-054534A). A technology disclosed in JP2009-054534A is the same as that in JP2009-171167A in that the display luminance is increased when surrounding environment is bright and the display luminance is decreased when surrounding environment is dark. However, the technology is different in that visibility is prevented from being deteriorated by suppressing the display luminance. The display luminance is suppressed in a way of controlling the gray scale of the display in conjunction with the display luminance. Specifically, particularly in a power saving mode for night scenes when the surrounding environment is dark, the gray scale of the display is increased more than a power saving mode for day scenes. Thereby, visibility is secured while the luminance is suppressed.

So far as the imaging device is driven by a battery, it is important to suppress power consumption of respective sections such as the electronic view finder, but the power consumption of a recent display device is suppressed using LEDs as a light source, as compared with the display device used in the past. Further, a capacity of the battery also has increased. Hence, the importance of suppressing power consumption of the electronic view finder has relatively decreased, and thus a recent imaging device is able to perform live view display at a substantially arbitrary brightness.

Recently, in the electronic view finder, there has been a demand for improvement in performance for performing photography comfortably such as an improvement in visibility. For example, when the display luminance of the electronic view finder is excessively brighter than a subject or surrounding environment, this may blind a user's eyes, may give a feeling of fatigue, and so on, that is, this prevents photography from being performed comfortably. Consequently, although power consumption is not intended to be suppressed, as described in JP2009-171167A and JP2009-054534A, it is preferable that the brightness of the surrounding environment is detected and the display luminance of the electronic view finder is controlled.

However, in such a case where a night scene is photographed, specifically, in a case where a subject or surrounding environment is dark and the display luminance of the electronic view finder is set to be low, even when the display luminance is intended to be matched with the brightness of the detected subject or the brightness of the detected surrounding environment, the display luminance may actually deviate from a desired display luminance. One reason for this is that, near the lower limit of a driving voltage of the electronic view finder, individual differences of variations in input/output characteristics and temperature dependent characteristics are large due to manufacturing errors and the like.

The blinding of a user's eyes and the feeling of fatigue, which are caused by excessively bright display of the electronic view finder, are remarkable when a subject or surrounding environment is dark. Hence, in such a case, it is necessary to reliably adjust the display luminance in accordance with the subject or the surrounding environment.

SUMMARY OF THE INVENTION

An object of the present invention is to provide an imaging device and an image display method capable of performing display on an electronic view finder at an appropriate luminance even when a subject or surrounding environment is dark.

An imaging device of the present invention includes an image sensor, a display section, an illuminance detection sensor, a subject luminance detection section, a target luminance calculation section, display luminance detection section, and a corrected luminance calculation section. The image sensor captures an image of a subject and outputs an imaging signal. The display section displays a live view image, which is generated on the basis of the imaging signal, at a set luminance. The illuminance detection sensor detects an illuminance around the display section. The subject luminance detection section detects a luminance of the subject on the basis of the live view image. The target luminance calculation section calculates a target luminance which is set as a display luminance of the display section on the basis of the luminance of the subject. A display luminance detection section detects an actual display luminance of the display section on the basis of a detected value of the illuminance detection sensor in the case where the target luminance is less than a first value. The corrected luminance calculation section calculates a corrected luminance which is set in the display section in order to make the actual display luminance close to the target luminance, on the basis of a difference between the target luminance and the actual display luminance of the display section which is set to the target luminance in the case where the target luminance is less than the first value. Control is performed such that the actual display luminance is made to be close to the target luminance by setting the display luminance of the display section to the target luminance in the case where the target luminance is equal to or greater than the first value and setting the display luminance of the display section to the corrected luminance after setting the display luminance of the display section to the target luminance in the case where the target luminance is less than the first value.

It is preferable that the imaging device further includes a time integration section that time-integrates the detected value of the illuminance detection sensor. In this case, the display luminance detection section detects the actual display luminance on the basis of the time-integrated detected value.

It is preferable that the imaging device further includes a display gray scale control section that decreases a display gray scale of the display section in the case where the target luminance is less than a second value which is less than the first value.

It is preferable that the imaging device further includes a correction section that corrects an output value of the illuminance detection sensor on the basis of the luminance of the subject. The correction section outputs a value, which is obtained by dividing the output value of the illuminance detection sensor by a ratio of an average luminance of the subject to a maximum luminance of the subject, as a correction value.

It is preferable that the display section displays an image for illuminance detection, instead of the live view image, at predetermined timing. In this case, the corrected luminance calculation section calculates the corrected luminance on the basis of a difference between the target luminance and the actual display luminance of the display section which is set to the target luminance and on which the image for illuminance detection is displayed. The image for illuminance detection is, for example, an image of which a luminance coincides with the luminance of the subject.

It is preferable that the display section includes a display device that displays the live view image, an observation port that is used for observing the display device, and a half mirror that passes light of the display device through the observation port and blocks outside light which is incident through the observation port.

The half mirror may partially reflect light of the display section, and make the light incident onto the illuminance detection sensor. Further, the illuminance detection sensor may be disposed between the half mirror and the display device, and may receive the light of the display device without using the half mirror.

In the case where the display section is a display device lighted by a backlight, the illuminance detection sensor may be mounted on the backlight, and may detect an illuminance of the backlight as illuminance of the display section.

An image display method of the present invention includes an image capturing step, a subject luminance detection step, a target luminance calculation step, a display luminance detection step, a corrected luminance calculation step, and a display luminance correction step. In the image capturing step, an image sensor captures an image of a subject, and outputs an imaging signal. In the subject luminance detection step, a luminance of the subject is detected by using a live view image generated on the basis of the imaging signal. In the target luminance calculation step, a target luminance, which is set as a display luminance of a display section displaying the live view image, is calculated on the basis of the luminance of the subject. In the display luminance detection step, an illuminance around the display section, which is set to the target luminance, is detected by an illuminance detection sensor, and an actual display luminance of the display section is detected on the basis of the detected illuminance, in the case where the target luminance is less than a first value. In the corrected luminance calculation step, a corrected luminance, which is set in the display section in order to make the actual display luminance close to the target luminance, is calculated on the basis of a difference between the target luminance and the actual display luminance of the display section which is set to the target luminance, in the case where the target luminance is less than the first value. In the display luminance correction step, control is performed such that the actual display luminance is made to be close to the target luminance by setting the display luminance of the display section to the target luminance in the case where the target luminance is equal to or greater than the first value and setting the display luminance of the display section to the corrected luminance after setting the display luminance of the display section to the target luminance in the case where the target luminance is less than the first value.

The imaging device and the image display method of the present invention adjusts the brightness of the display section, which functions as the electronic view finder, by detecting not only the brightness of the subject but also the actual illuminance of the display section. Therefore, it is possible to perform display on the electronic view finder at an appropriate brightness even when a subject or surrounding environment is dark.

BRIEF DESCRIPTION OF DRAWINGS

For more complete understanding of the present invention, and the advantage thereof, reference is now made to the subsequent descriptions taken in conjunction with the accompanying drawings, in which.

DESCRIPTION OF THE PREFERRED EMBODIMENTS

First Embodiment

Figure 1:
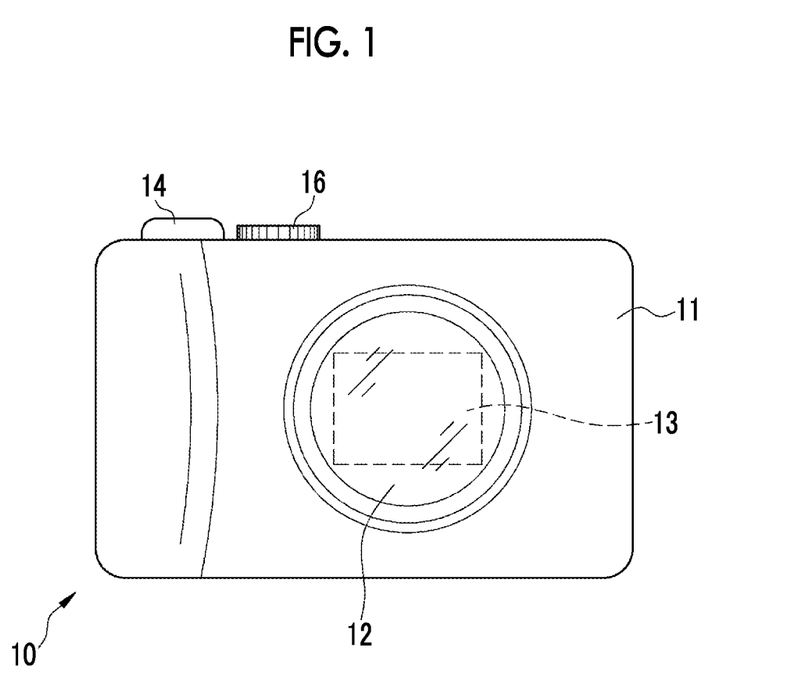
FIG. 1 is a front view of an imaging device.

In FIG. 1, an imaging device 10 is a digital camera including: a main body 11 into which an image sensor 13 and the like are built and which has a substantially rectangular parallelepiped shape; and an image capture lens 12 which is mounted on the front surface of the main body 11. The imaging device 10 causes the image capture lens 12 to form an image of a subject on the image sensor 13, causes the image sensor 13 to capture the image of the subject, and generates a photographed image of the subject on the basis of the imaging signals which are output from the image sensor 13. For example, a photography instruction input switch 14 which is for inputting a photography instruction, a mode switch dial 16 which is for switching between a plurality of photography modes provided in advance, and the like are provided on the upper surface of the main body 11.

Figure 2:
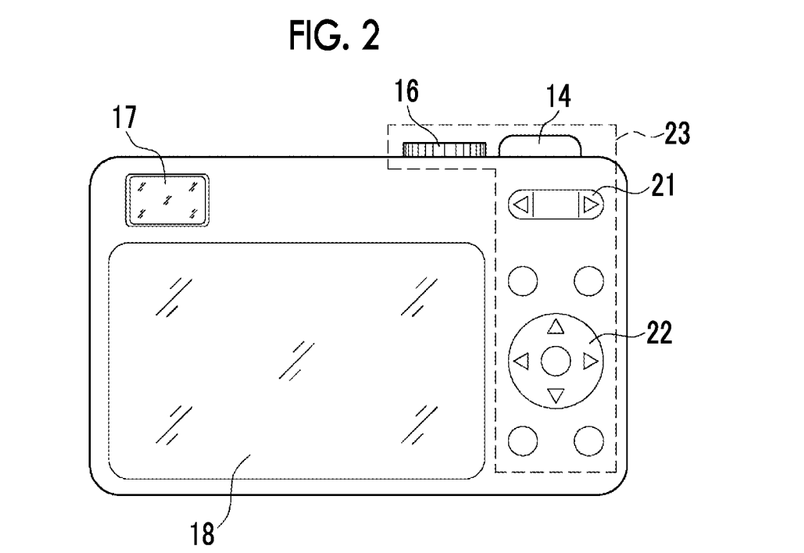
FIG. 2 is a rear view of the imaging device.

In FIG. 2, a first display section 17, a second display section 18, a zoom button 21, a multi-function button 22, and the like are provided on the rear surface of the main body 11.

The first display section 17 is a small-sized display device that displays a live view image substantially in real time, and is an electronic view finder that is used to check a photography area and perform a focusing operation. The live view image is generated on the basis of the imaging signals which are sequentially output at a predetermined frame rate (for example, 60 fps) by the image sensor 13.

The second display section 18 is a liquid crystal display panel having a display screen of which the size is larger than that of the first display section 17, and displays previously photographed images or a menu screen for performing various kinds of setting of the imaging device 10. On the basis of the setting, instead of the first display section 17 (or together with the first display section 17), the imaging device 10 may cause the second display section 18 to function as an electronic view finder. In the present embodiment, the first display section 18 is used as an electronic view finder.

The zoom button 21 is an operation button which is used in zoom control for changing a focal length of the image capture lens 12. The multi-function button 22 is an operation button which is used in selecting and determining a photographed image or various menus displayed on the second display section 18. The zoom button 21 and the multi-function button 22 constitute an operation section 23, together with the photography instruction input switch 14 and the mode switch dial 16.

Figure 3:
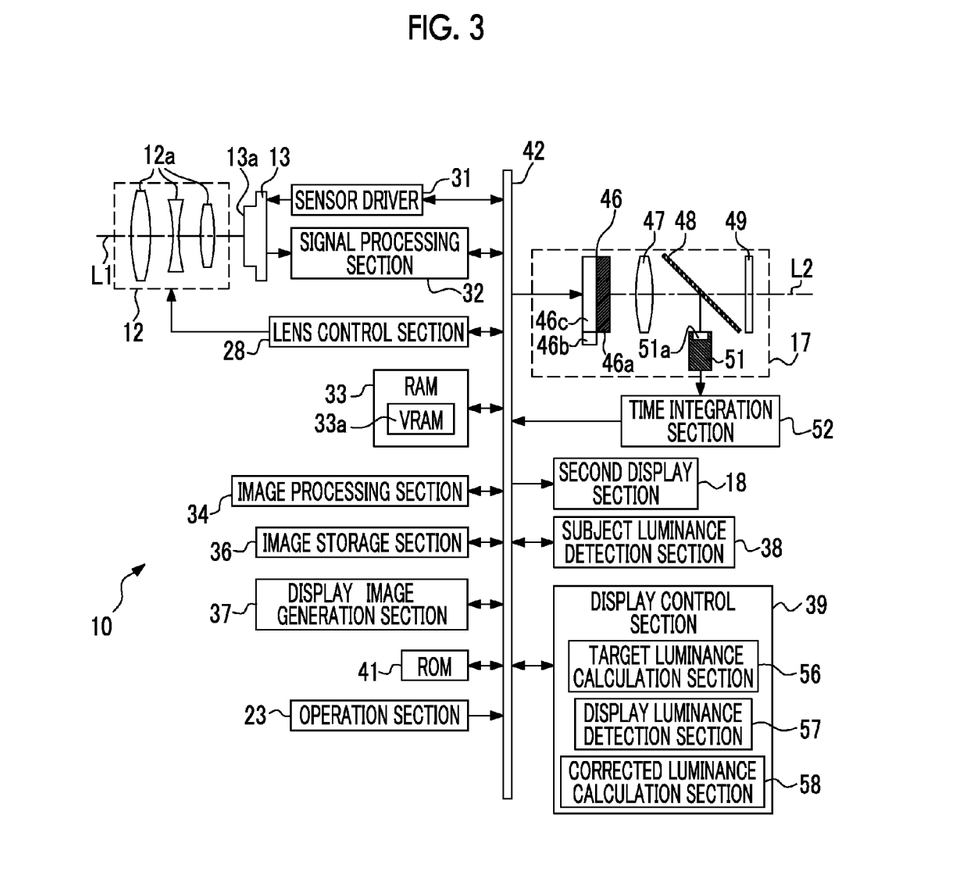
FIG. 3 is a block diagram of the imaging device.

In FIG. 3, the imaging device 10 includes the image capture lens 12, the image sensor 13, the first display section 17, the second display section 18, the operation section 23, a sensor driver 31, a signal processing circuit 32, a RAM 33, an image processing section 34, a display image generation section 37, a subject luminance detection section 38, a display control section 39, and the like. The respective sections of the imaging device 10 are connected to each other through a bus 42. Further, some of the respective sections of the imaging device 10 are implemented as functions of a CPU which is not shown, and control programs, setting data, and the like to be used are stored in the ROM 43 in advance.

The image capture lens 12 has a plurality of lenses 12a. The plurality of lenses 12a includes: a lens (lens group) that moves along the optical axis L1 in order to adjust the focal length; a focusing lens (lens group) that moves along the optical axis L1 in order to perform focus adjustment; and various driving mechanisms that are for driving the lenses.

The plurality of lenses 12a also includes: a correction lens that is provided to be movable in a direction perpendicular to the optical axis L1 so as to move in directions that counteract camera shake; an aperture stop that is for adjusting an exposure amount; and the like. In addition, although FIG. 3 shows three lenses as the image capture lens 12, the number of lenses may be arbitrary, and the image capture lens may include optical elements such as various optical filters other than the lenses, a lens that substantially has no power, and the like.

A lens control section 28 adjusts the focal length of the image capture lens 12 on the basis of a zoom signal which is input from the operation section 23 through an operation performed on the zoom button 21. Further, if a photography mode for automatically performing focus adjustment is set, the lens control section 28 automatically performs focus adjustment (focusing operation) by adjusting a position of the focusing lens on the basis of a focus evaluation value which is input from the signal processing section 31. In addition, the lens control section 28 also adjusts an aperture ratio of the aperture stop and the like.

The image sensor 13 is disposed behind the image capture lens 12 such that an image capture surface 13a thereof faces the image capture lens 12. The image capture surface 13a is a region in which a plurality of pixels is two-dimensionally arranged. The image of the subject is formed on the image capture surface 13a. The image sensor 13 captures an image by performing photoelectric conversion on the formed image of the subject for each pixel, and outputs an imaging signal for each pixel line.

When the imaging device 10 photographs the subject, the imaging signals, which are sequentially output at a frame rate which is predetermined by the setting, is used in generation of the live view image. Further, the imaging signals, which are output when a photography instruction is input through the operation section 23 (an operation of pressing photography instruction input switch 14), are used in generation of a photographed image to be stored. In addition, in the present embodiment, the image sensor 13 is a CMOS type, but may be a CCD type.

The sensor driver 31 controls operations of the image sensor 13. For example, in accordance with the setting, the followings are controlled: the frame rate that is for outputting the imaging signals for the live view image; an imaging signal reading method; a shutter speed (exposure time) for capturing a photographed image to be stored; and the like.

The signal processing section 32 is an image engine that generates image data (photographed images and live view images) by applying various kinds of signal processing such as demosaic processing to the imaging signals which are output by the image sensor 13. The image data generated by the signal processing section 32 is temporarily stored in the RAM 33.

The signal processing section 32 detects the optimal white balance value on the basis of the input imaging signals in accordance with the setting, and automatically adjusts the white balance value of the image data. Further, the signal processing section 32 calculates a focus evaluation value by using the input imaging signals. The detected white balance value and the focus evaluation value are input to the lens control section 28, and are used in auto-focus adjustment and adjustment of an exposure amount (an aperture ratio of the aperture stop).

When the image data generated by the signal processing section 32 is a photographed image to be stored, the photographed image stored in the RAM 33 is read and subjected to various kinds of image processing such as γ correction processing and gray scale conversion processing by the image processing section 34, and thereafter the image is stored in an image storage section 36. In contrast, when the image data generated by the signal processing section 32 is a live view image, the live view image stored in the RAM 33 is read by the display image generation section 37.

The display image generation section 37 generates a display image for performing display on the first display section 17 by using the live view image which is read from the RAM 33. The display image is, for example, an image in which characters, signs, and indicators indicating setting parameters of the photography mode are superimposed on the live view image. The display image generated by the display image generation section 37 is temporarily stored in a VRAM 33a, and is sequentially read and displayed on the first display section 17.

The VRAM 33a is a memory region which is reserved in the RAM 33 in advance so as to temporarily store the display image. It is apparent that the VRAM 33a may be provided separately from the RAM 33. Further, in a case of setting in which the second display section 18 is used as the electronic view finder, the display image generation section 37 generates a display image to be displayed on the second display section 18, and stores the image in the VRAM 33a, and the second display section 18 reads the display image from the VRAM 33a, and display the image.

The first display section 17 includes a liquid crystal display device 46 that displays a display image, a finder lens 47, a half mirror 48, an observation port 49, an illuminance detection sensor 51, and the like. The liquid crystal display device 46 is observed through the transparent observation port 49 along an optical axis L2.

The liquid crystal display device 46 has a liquid crystal panel 46a that displays the display image, and a backlight that illuminates the liquid crystal panel 46a from the rear side. The backlight is an edge light method, and has a light source 46b that is formed of white LEDs and the like provided near the edge of the liquid crystal panel 46a, and a light guide plate 46c that guides light emitted from the light source 46b so as to substantially uniformly illuminate the liquid crystal panel 46a from the rear side.

The finder lens 47 is provided to be movable along the optical axis L2 in order to adjust a diopter scale. FIG. 3 shows a single lens as the finder lens 47, but the finder lens 47 is formed of a plurality of lenses. In addition, the finder lens 47 also includes an eyepiece lens (not shown) disposed between the half mirror 48 and the observation port 49.

The half mirror 48 reflects a part of display light (light transmitted through the liquid crystal panel 46a) emitted from the liquid crystal display device 46, and make the light incident onto the illuminance detection sensor 51. Further, the half mirror 48 reflects outside light which is incident through the observation port 49, and therefore does not make the light incident into the illuminance detection sensor 51.

The illuminance detection sensor 51 detects an illuminance of the liquid crystal display device 46 (at least an illuminance around the liquid crystal display device 46), on the basis of a light amount of light which is incident into a light receiving portion 51a through the half mirror 48. In addition, the illuminance detection sensor 51 is driven when a subject is dark, and is not driven when a subject is bright. The illuminance detection sensor 51 detects an illuminance in a state where the display image (live view image) is displayed on the liquid crystal display device 46. The detected value of the illuminance detection sensor 51 is an instantaneous illuminance of the liquid crystal display device 46 at a detection time point, and inputs the illuminance to a time integration section 52.

The time integration section 52 calculates a value (hereinafter, referred to as an integrated illuminance) which is obtained by time-integrating the detected value of the illuminance detection sensor 51. The integrated illuminance calculated by the time integration section 52 is input to the display control section 39, and is used in order to determine the display luminance of the first display section 17 and the like.

The subject luminance detection section 38 detects the luminance of the subject by using the live view image stored in the RAM 33. The subject luminance detection section 38 calculates, for example, the luminance of each pixel in a predetermined range of the live view image, and detects the luminance of the subject by calculating the average value. A predetermined range, to which the subject luminance detection section 38 refers, is a range corresponding to a range which is used by the illuminance detection sensor 51 in detection of an illuminance on the display image. If the illuminance detection sensor 51 detects an illuminance with reference to the entire range of the live view image included in the display image, the subject luminance detection section 38 detects an average value of the luminance of all the pixels of the live view image as the subject luminance.

The subject luminance detection section 38 detects the subject luminance whenever the live view image is generated. The subject luminance detected by the subject luminance detection section 38 is input to the display control section 39, and is used in order to determine the display luminance of the first display section 17 and the like.

The display control section 39 controls a display gray scale, a display luminance, timing of displaying the display image on the first display section 17. For example, the display control section 39 performs control to perform the live view display in substantially real time by controlling the display timing of the first display section 17 in synchronization with the imaging signals for the live view image which are output by the image sensor 13.

The display control section 39 includes a target luminance calculation section 56, a display luminance detection section 57, and a corrected luminance calculation section 58 in order to appropriately adjust the display luminance or the display gray scale of the first display section 17 (liquid crystal display device 46).

The target luminance calculation section 56 calculates a target luminance, on the basis of the subject luminance which is acquired from the subject luminance detection section 38. The target luminance is an optimum display luminance of the first display section 17 corresponding to the brightness of the subject. Specifically, the target luminance calculation section 56 sets a luminance, which is low by an amount of one stage (an amount corresponding to 1 EV) from the subject luminance, if the subject luminance is equal to or greater than a first threshold value $Th_1$ (for example, a luminance corresponding to 5 Exposure Value (EV)), as a target luminance by comparing the acquired subject luminance with the first threshold value $Th_1$. In contrast, if the acquired subject luminance is less than the first threshold value $Th_1$, a luminance, which is brighter by an amount of one stage than a value the same as the subject luminance, is set as the target luminance. In the present embodiment, if the subject luminance is less than the first threshold value $Th_1$, the subject luminance is set to the target luminance. It should be noted that the EV value is a value indicating an exposure amount determined by a sensitivity of the image sensor 13 and a shutter speed and an aperture ratio of the aperture stop, and corresponds to the brightness of the photographed image (live view image).

The display control section 39 changes a control state of the liquid crystal display device 46 by comparing a second threshold value (corresponding to a "first value") $Th_2$ with the target luminance calculated by the target luminance calculation section 56. The second threshold value $Th_2$ is a value for identifying whether or not an individual difference of the liquid crystal display device 46 appears. If the target luminance is equal to or greater than the second threshold value $Th_2$, the display control section 39 performs control such that the display luminance of the liquid crystal display device 46 is the target luminance. Then, the display luminance coincides with the target luminance, regardless of the individual difference of the liquid crystal display device 46. In contrast, if the target luminance is less than the second threshold value $Th_2$, in accordance with the temperature of the liquid crystal display device 46 and the like, the individual difference of the liquid crystal display device 46 may appear. In this case, even though control is performed such that the display luminance of the liquid crystal display device 46 is the target luminance, the actual display luminance may not be the target luminance.

Hence, if the target luminance is equal to or greater than the second threshold value $Th_2$, the display control section 39 performs normal control such that the display luminance of the liquid crystal display device 46 is the target luminance. In contrast, if the target luminance is less than the second threshold value $Th_2$, control is performed such that the display luminance of the liquid crystal display device 46 is the target luminance. Thereafter, by using the display luminance detection section 57 and the corrected luminance calculation section 58, feedback control is performed such that the display luminance coincides with the target luminance.

The display luminance detection section 57 acquires the integrated illuminance from the time integration section 52, and detects the actual display luminance of the first display section 17 (liquid crystal display device 46), on the basis of the acquired integrated illuminance. A calculation expression (or LUT for conversion) or a parameter for calculating the display luminance from the integrated illuminance, such as a distance from the liquid crystal display device 46 to the illuminance detection sensor 51, is stored in the ROM 41 in advance.

The corrected luminance calculation section 58 calculates the corrected luminance on the basis of the target luminance and the actual display luminance. The corrected luminance is a control parameter of the liquid crystal display section 46 for making the actual display luminance coincide with (or asymptotic to) the target luminance.

Specifically, a difference $\Delta X (=X_A-X_B)$ between a target luminance $X_A$ and an actual display luminance $X_B$ obtained when the liquid crystal display device 46 is controlled to be at the target luminance $X_A$ is calculated. Then, a value of $X_A+\Delta X (=2X_A-X_B)$, which is obtained by adding the difference $\Delta X$ to the target luminance $X_A$, is set as a corrected luminance. For example, it is assumed that the target luminance $X_A$ is 100 cd/m², and control is performed such that the display luminance is the target luminance $X_A$. Under the assumption, if the actual display luminance $X_B$ is 120 cd/m², the difference $\Delta X$ is −20 cd/m², and therefore the corrected luminance $X_A+\Delta X$ is 80 cd/m². The display control section 39 controls the liquid crystal display device 46 so as to obtain 80 cd/m² (corrected luminance), thereby making the actual display luminance coincide with 100 cd/m² as the target luminance.

Figure 4:
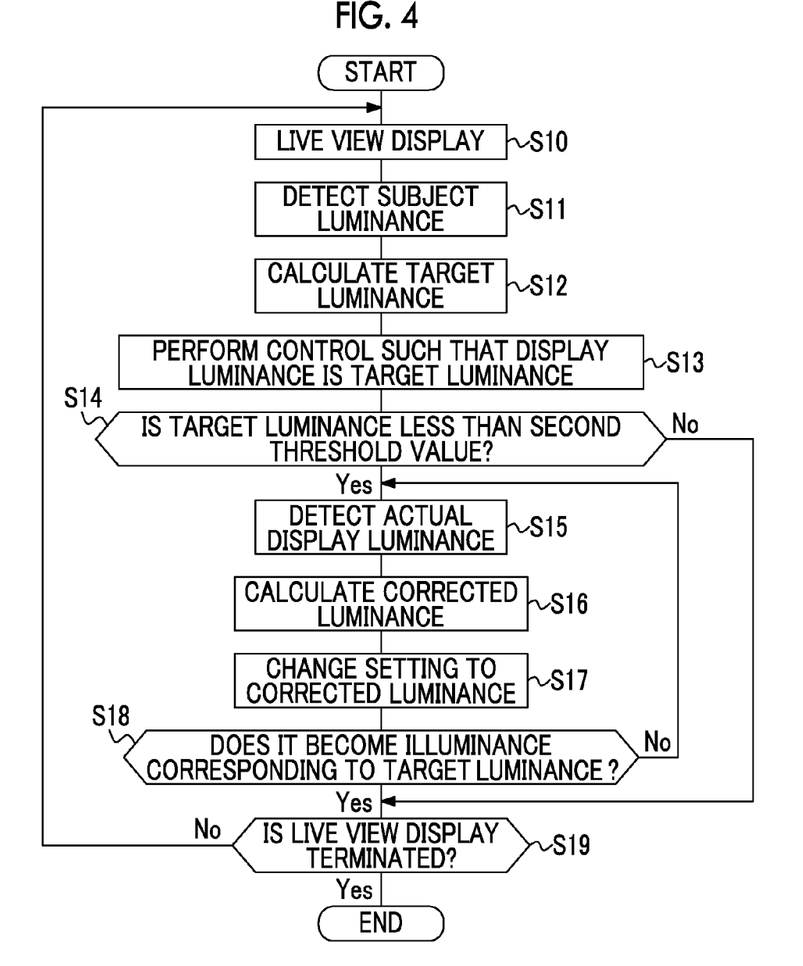
FIG. 4 is a flowchart illustrating operations of the imaging device.

Operations of the imaging device 10 configured as described above will be described. As shown in FIG. 4, when power is turned on and the respective sections of the imaging device 10 such as the image sensor 13 are active, a photography area is displayed as the live view display on the first display section 17 substantially in real time (S10). Specifically, if power is turned on, the image sensor 13 starts outputting the imaging signals for the live view image. The signal processing section 32 generates a live view image on the basis of the imaging signals, and the display image generation section 37 generates a display image by superimposing characters, signs, and the like on the generated live view image. The display control section 39 displays the generated display image on the liquid crystal display section 46.

In contrast, if the subject luminance detection section 38 reads the live view image generated by the signal processing section 32 from the RAM 33 and detects a subject luminance (S11), the target luminance calculation section 56 calculates the target luminance by comparing the first threshold value $Th_1$ with the subject luminance detected by the subject luminance detection section 38 (S12). The display control section 39 controls the liquid crystal display device 46 such that the display luminance is the target luminance (S13). Specifically, the display control section 39 adjusts driving current of the light source 46b such that the display luminance is the target luminance.

The display control section 39 compares the calculated target luminance with the second threshold value $Th_2$ (S14). If the target luminance is equal to or greater than the second threshold value $Th_2$ (No is determined in S14), individual differences such as temperature characteristics of the liquid crystal display device 46 scarcely appear. In this case, if the control is performed such that the display luminance is the target luminance, the actual display luminance is approximately equal to the target luminance. Therefore, correction of the display luminance is not performed. In contrast, if the target luminance is less than the second threshold value $Th_2$ (Yes is determined in S14), due to individual differences such as temperature characteristics of the liquid crystal display device 46, even though the control is performed such that the display luminance is the target luminance, the actual display luminance may not be set to be equal to the target luminance. Therefore, the display luminance is corrected.

Specifically, if the target luminance is less than the second threshold value $Th_2$, the display luminance detection section 57 detects the actual display luminance of the first display section 17, on the basis of the integrated illuminance which is acquired from the time integration section 52 (S15). Subsequently, the corrected luminance calculation section 58 calculates the corrected luminance on the basis of the target luminance and the actual display luminance (S16). The display control section 39 controls the liquid crystal display device 46 such that the display luminance is the calculated corrected luminance, thereby making the actual display luminance close to the target luminance (S17). In addition, the display control section 39 appropriately repeats steps S15 to S17 for correcting the actual display luminance (S18), thereby making the actual display luminance close to the target luminance.

Determination as whether or not the actual display luminance is the target luminance is performed, for example, by comparing the third threshold value $Th_3$ with the difference between the target luminance and the actual display luminance detected in step S15. If the difference is less than the third threshold value $Th_3$, it is determined that the actual display luminance coincides with the target luminance.

The control is repeatedly performed for each single frame until the live view display is terminated (Yes is determined in S19) through a user's operation for opening a setting menu, an operation for listing previously photographed images, and the like.

As described above, the imaging device 10 adjusts the display luminance of the first display section 17 as an electronic view finder in accordance with the brightness of the subject (surrounding environment), and is therefore able to perform photography comfortably through appropriate adjustment of the brightness of the first display section 17. In particular, the subject may be dark, and the first display section 17 may have to be dark to some extent that the individual differences such as the temperature characteristics of the liquid crystal display device 46 appear. In this case, the imaging device 10 detects performs not only the correction of the subject luminance but also detects the actual display luminance of the first display section 17 by using the illuminance detection sensor 51 and performs correction such that the subject luminance coincides with the actual display luminance. Therefore, it is possible to constantly perform live view display at appropriate brightness.

The imaging device 10 does not directly use the detected value of the illuminance detection sensor 51, but uses the integrated illuminance which is time-integrated by the time integration section 52. In this configuration, the time period of dark adaptation is considered. That is, if a subject or surrounding environment is changed to be dark, before a user adapts to dark, the display luminance of the first display section 17 may be made to coincide with the subject immediately. In this case, the first display section 17 unintentionally causes the user to perceive a dim image, and thus it may be rather difficult to view the live view display. The imaging device 10 uses the integrated illuminance, and is thus able to perform live view display which a user comfortably views even in the process of dark adaptation.

If the display luminance is intended to be corrected promptly and precisely, the display luminance of the first display section 17 may be corrected directly using the detected value of the illuminance detection sensor 51 without the time integration section 52. It is apparent that setting may be made to assist a user to select whether or not to use the time integration section 52. Further, for example, the time integration section 52 may be automatically used if change in subject luminance is greater than a predetermined threshold value (fourth threshold value $Th_4$). Otherwise, the detected value of the illuminance detection sensor 51 may be directly used. It is preferable that the display control section 39 monitors the subject luminance. In this case, the display control section 39 functions as a subject luminance monitoring section.

After the display control section 39 corrects the display luminance of the liquid crystal display device 46 in accordance with the flow of FIG. 4 (S15 to S17), if the live view display of the next frame is performed, the target luminance based on the subject luminance is set again (S13). Further, in general, since change of subject in the live view image of continuous frames is small, the target luminance is approximately equal to the target luminance of the previous frame. Hence, regardless of correction of the display luminance of the liquid crystal display device 46, the control is performed such that the display luminance is a target luminance (S13), at the next frame. Therefore, the actual display luminance is brighter (or darker) than the target luminance first, and is corrected again. When an operation is repeated, the live view display of the first display section 17 is lighted on and off for each frame. Therefore, if the difference between the actual display luminance and the target luminance is large, a user may notice the change in display luminance, and this situation may interrupt photography.

Hence, at a frame at which the display luminance of the liquid crystal display device 46 is corrected, the subject luminance may be compared with the subject luminance of the previous frame, and the difference of the subject luminances may be less than a predetermined threshold value. In this case, in steps S12 or S13, it is preferable that the target luminance is set as the corrected luminance (final value of corrected luminance) calculated from the previous frame, and the subsequent control is performed. Further, if the difference between subject luminances of the current and previous frames is equal to or greater than a predetermined threshold value (fifth threshold value $Th_5$), as described above, the target luminance is set in accordance with the subject luminance, and the subsequent control is performed. In such a manner, it is possible to prevent the live view display, of which the display luminance is corrected in advance, from lighting on and off. It is preferable that the display control section 39 compares the subject luminances of the frames. In this case, the display control section 39 functions as a subject luminance comparing section.

Second Embodiment

In the imaging device 10 of the first embodiment, it is preferable that the brightness of the first display section 17 as an electronic view finder is adjusted by controlling the display luminance, but the brightness of the first display section 17 is adjusted through combination of the display luminance and the display gray scale.

Figure 5:
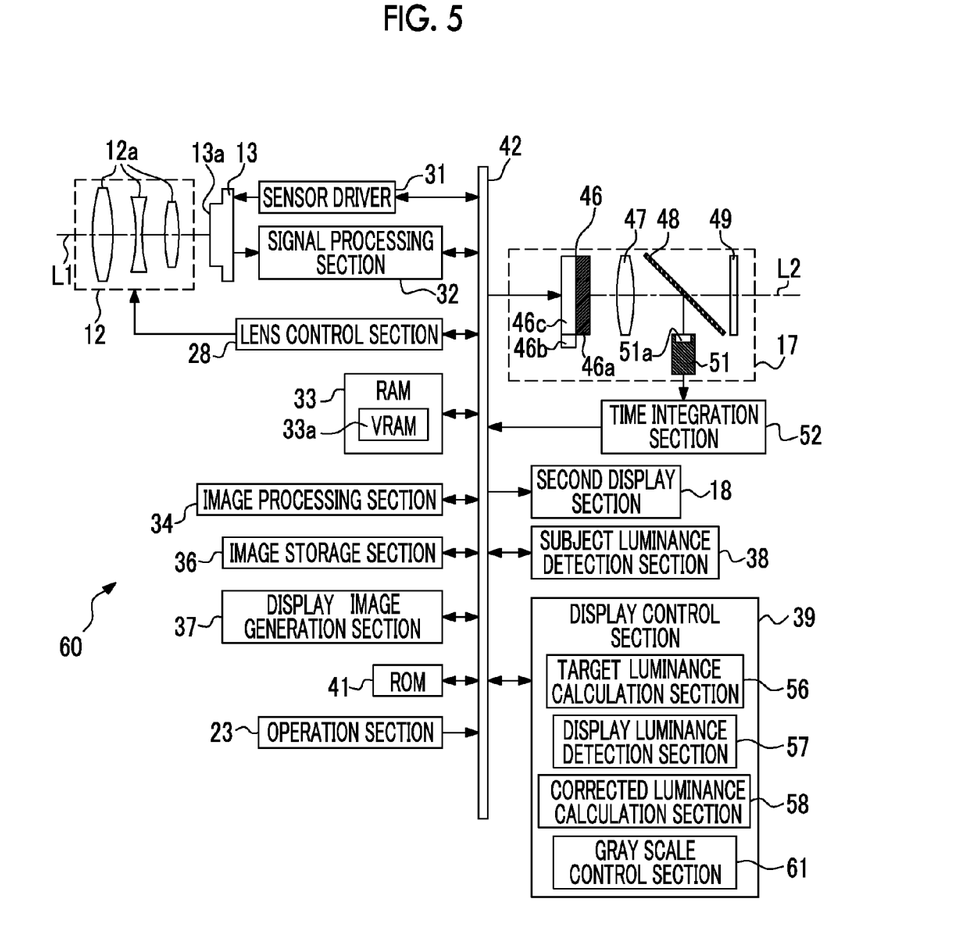
FIG. 5 is a block diagram of the imaging device to which a gray scale control section is added.

In FIG. 5, an imaging device 60 is different from the imaging device 10 of the first embodiment (refer to FIG. 3) in that the gray scale control section 61 is added. The gray scale control section 61 controls the display gray scale of the liquid crystal display device 56. Specifically, the gray scale control section 61 compares the target luminance with a predetermined threshold value (sixth threshold value $Th_6$ corresponding to a "second value"), and decreases the display gray scale of the liquid crystal display device 46 if the target luminance is less than the predetermined threshold value. If the target luminance is equal to or greater than the predetermined threshold value, the liquid crystal display device 46 is controlled to perform display at a gray scale which is predetermined through setting. For example, the liquid crystal display device 46 may be a liquid crystal display device capable of performing full color display of 8 bits (256 gray scales) per one color. In this case, if the target luminance is less than the sixth threshold value $Th_6$, the display gray scale is reduced to 7 bits (128 gray scales), thereby reducing the brightness of the first display section 17.

Figure 6:
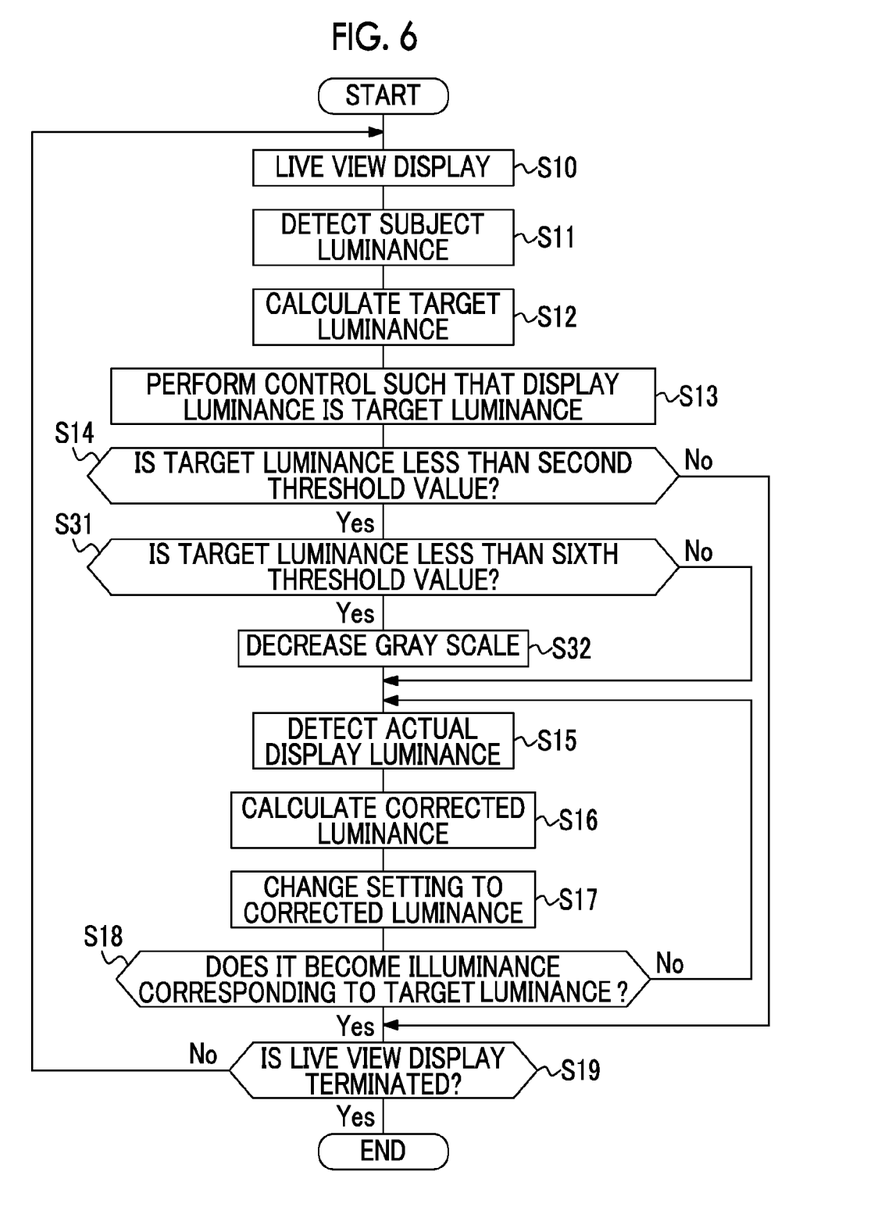
FIG. 6 is a flowchart illustrating operations of the imaging device shown in FIG. 5.

As shown in FIG. 6, comparison (S31) between the target luminance and the sixth threshold value $Th_6$ performed by the gray scale control section 61 is performed if the target luminance is less than the second threshold value $Th_2$ (Yes is determined in S14), after the target luminance and the second threshold value $Th_2$ are compared (S14). If the target luminance is equal or greater than the sixth threshold value $Th_6$, the gray scale control section 61 controls the liquid crystal display device 46 such that it performs display at a predetermined gray scale, and thereafter corrects the display luminance in a manner similar to that of the first embodiment (S15 to S18). In contrast, if the target luminance is less than the sixth threshold value $Th_6$, the gray scale control section 61 performs control so as to decrease the display gray scale of the liquid crystal display device 46 (S32), and thereafter corrects the display luminance (S15 to S18).

That is, the darker the subject and the less likely it is that individual differences, such as temperature characteristics of the liquid crystal display device 46 are negligible, the lower the target luminance may be. In this case, basically by adjusting a light amount of the light source 46b of the backlight, the display luminance is corrected. However, if the target luminance is especially low even in an area having a low target luminance, not only the display luminance is adjusted, but also the display gray scale is decreased first. Then, the brightness of the first display section 17 is decreased, and the display luminance (a light emission amount of the light source 46b of the backlight) is adjusted in a state where the display is changed to be dark through the reduction of the display gray scale, thereby correcting the brightness of the first display section 17. In such a manner, even when it is difficult to adjust the brightness of the first display section 17 only by adjusting the display luminance, the brightness of the first display section 17 can be set appropriately. For example, if the driving current of the light source 46b of the backlight is excessively small, accuracy of control is poor. However, by decreasing the display gray scale and decreasing the brightness of the first display section 17 in advance, it is possible to control the display luminance within a range in which accuracy of control of the light source 46b is good.

However, if the display gray scale is decreased, image quality of the display image (live view image) decreases, and thus it may be difficult to view the image. Hence, as described above, if the brightness of the first display section 17 can be corrected only through adjustment of the display luminance (No is determined in S31), the brightness of the first display section 17 is corrected only through adjustment of the display luminance. Thus, it is preferable that the control of the display gray scale is performed if the brightness of the first display section 17 cannot be corrected only through adjustment of the display luminance (Yes is determined in S31).

In the imaging device 60, the gray scale control section 61 is provided in the display control section 39, and controls the display gray scale of the first display section 17. However, instead of controlling the display gray scale of the first display section 17, by controlling the luminance of the display image to be displayed on the first display section 17, the luminance may be decreased to be lower than that of the display image which is normally generated. As described above, processing of decreasing the luminance of the display image can be performed, for example, at a time point of generating the display image through the display image generation section 37.

If the luminance of the display image is decreased, it may be difficult to view display contents, similar to the case of decreasing the display gray scale. Therefore, in the case of decreasing the luminance of the display image, it is preferable to increase a chroma. The reason for this is that, if the luminance is low but the chroma is high, even though the image is dark overall, it is easy to identify details of the image. Further, if deterioration in visibility caused by a decrease in luminance of the display image is compensated, instead of the chroma, the contrast or the sharpness may be increased. It is apparent that the adjustment may be performed through combination of the chroma, the contrast, and the sharpness.

Third Embodiment

First, the imaging devices 10 and 60 of the first and second embodiments detect the illuminance of the liquid crystal display device 46 in a state where the display image including the live view image is displayed when the subject luminance is detected. In such a manner, when the illuminance of the liquid crystal display device 46 is detected in a state where the display image including the live view image is displayed, contents (subject) of the live view image, which is being displayed, have an effect on the detection result. For example, if an image photographed at night includes a lighted-up structure, the detected value of the illuminance detection sensor 51 reflects the brightness of the lighted-up structure. Thus, an illuminance brighter than an overall (average) illuminance is detected. In this case, the corrected brightness of the first display section 17 may not be matched with an overall brightness of the subject. Hence, it is preferable to correct the detected value of the illuminance detection sensor 51 such that the detected value is matched with the overall brightness of the subject.

Figure 7:
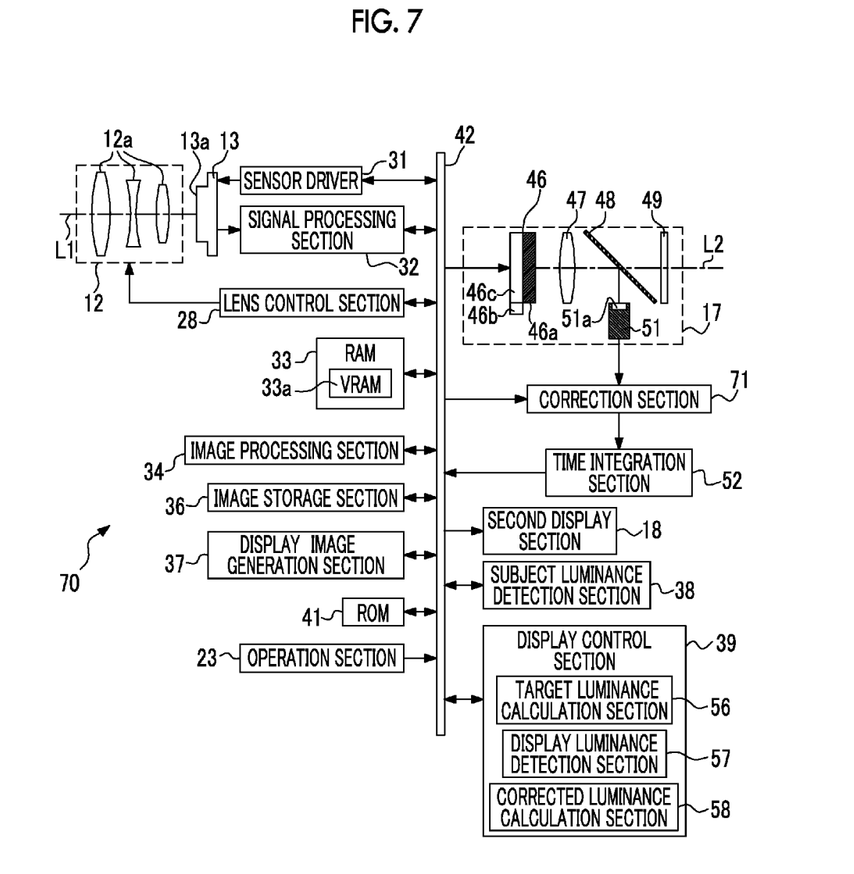
FIG. 7 is a block diagram of the imaging device to which a correction section is added.

In FIG. 7, an imaging device 70 is different from the imaging device 10 of the first embodiment (refer to FIG. 3) in that a correction section 71 is added. The correction section 71 corrects the detected value of the illuminance detection sensor 51 such that the detected value corresponds to the overall brightness of the subject. The correction section 71 respectively acquires the detected value from the illuminance detection sensor 51, and the maximum luminance of the subject and the subject luminance from the subject luminance detection section 38. The correction section 71 inputs the corrected detected value, which is calculated by dividing the detected value of the illuminance detection sensor 51 by a ratio of the subject luminance to the maximum luminance, to the time integration section 52. Specifically, assuming that the detected value of the illuminance detection sensor 51 is $I_{RAW}$, the subject luminance is $B_{OBJ}$, and the maximum luminance of the live view image is $B_{MAX}$, the corrected detected value $I_{COR}$ is represented by $$I_{COR}=I_{RAW}/(B_{OBJ}/B_{MAX})=I_{RAW}\times B_{MAX}/B_{OBJ}.$$

If the subject includes a high luminance substance, the actual detected value $I_{RAW}$ is an illuminance corresponding to the maximum luminance $B_{MAX}$ included in the subject, and is a value which deviates from the illuminance corresponding to the average luminance (subject luminance $B_{OBJ}$) of the subject. However, the corrected detected value $I_{COR}$ is calculated so as to match a ratio $I_{COR}/I_{RAW}$ of the corrected detected value $I_{COR}$ to the actual detected value $I_{RAW}$ with a ratio $B_{OBJ}/B_{MAX}$ of the subject luminance (average value) to the maximum luminance of the subject. Therefore, the corrected detected value $I_{COR}$ is a value which is approximate to an illuminance corresponding to the subject luminance $B_{OBJ}$. Hence, when the corrected detected value $I_{COR}$ is used, it is possible to correctly detect the display luminance of the first display section 17 in which the entire subject is reflected, without depending on partial characteristics of the subject partially including the high luminance substance and the like.

In FIG. 7, the correction section 71 is added to the imaging device 10 of the first embodiment, but the correction section 71 may be provided in the imaging device 60 of the second embodiment.

Without depending on partial characteristics of the subject, in order to detect the display luminance of the first display section 17 in which the entire subject is reflected, in the imaging device 70 of a third embodiment, the correction section 71 corrects the detected value of the illuminance detection sensor 51. However, the detection result of the display luminance of the first display section 17 may be made to not depend on partial characteristics of the subject in a separate method.

Figure 8:
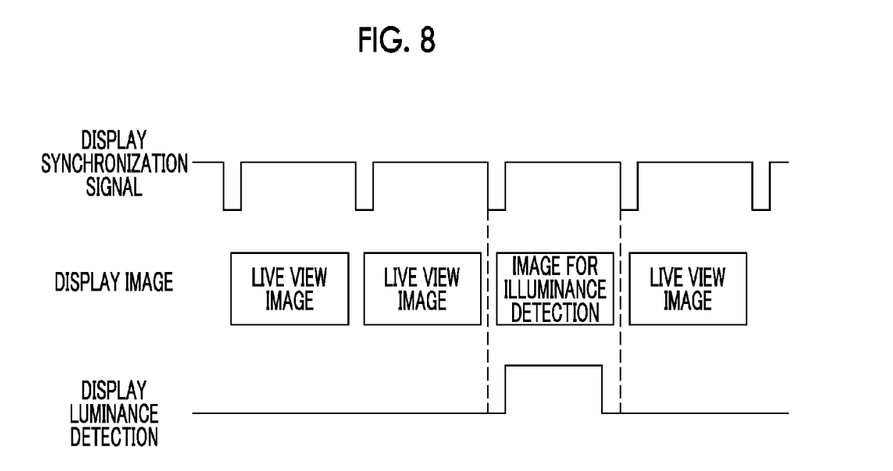
FIG. 8 is a timing chart illustrating display timing and timing of detecting the display luminance.

As shown in FIG. 8, the display control section 39 inputs display synchronization signals to the liquid crystal display device 46 with certain time intervals, thereby sequentially updating and displaying the display images including the live view images on the liquid crystal display device 46. For example, when the display control section 39 controls the frame rate of the display of the liquid crystal display device 46 at 120 fps, the display time period of a single image is an extremely short time period of about 8 ms. Hence, for example, even when an image corresponding to a single frame is replaced with another image, a normal user cannot recognize it.

Therefore, the display control section 39 performs control so as to display the image displayed on the first display section 17 instead of the image for illuminance detection only once per several frames (for example, at one image per 120 frames), and causes the display luminance detection section 57 to detect the display luminance of the first display section 17 in accordance with timing of displaying the image for illuminance detection. The image for illuminance detection is a uniform gray scale image in which luminances of all the pixels are set as the subject luminance detected by the subject luminance detection section 38. The image for illuminance detection is generated by the display image generation section 37 in response to the instruction of the display control section 39.

As described above, in a short time period which a user cannot recognize, the image for illuminance detection is displayed instead of the display image including the live view image. Then, when detecting the display luminance of the first display section 17 at which the image for illuminance detection is displayed, it is possible to detect the display luminance of the first display section 17 without the effects of the partial characteristics of the subject.

Figure 9:
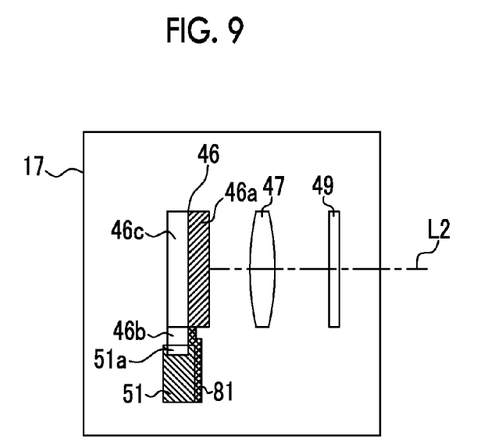
FIG. 9 is a block diagram illustrating another configuration of a first display section.

In the imaging devices 10, 60, and 70 of the first to third embodiments, the illuminance of the liquid crystal display device 46 is detected through the half mirror 48. However, as shown in FIG. 9, the light receiving portion 51a of the illuminance detection sensor 51 may be directly mounted on the light source 46b. In this case, the illuminance detection sensor 51 detects the illuminance of the light source 46b as the illuminance of the liquid crystal display device 46. Therefore, the detected value is a value different from that in the case where the illuminance is detected using the display light passing through the liquid crystal panel 46a. Hence, for example, a correspondence relationship between the illuminance of the light source 46b and the illuminance of the display light passing through the liquid crystal panel 46a is measured, and a conversion expression, a LUT, and the like are retained in advance. In the display luminance detection section 57, if the display luminance is detected, the detected value of the illuminance detection sensor 51 or the integrated illuminance, which is output by the time integration section 52, is used in terms of an illuminance of the display light.

In the imaging devices 10, 60, and 70 of the first to third embodiments, the half mirror 48 prevents the outside light from being incident into the illuminance detection sensor 51. However, as shown in FIG. 9, when the illuminance detection sensor 51 is directly mounted on the light source 46b of the liquid crystal display panel 46, there is no half mirror 48. Hence, it is preferable to provide a light blocking member 81 for preventing the outside light from being incident into the illuminance detection sensor 51 and the light source 46b.

Figure 10:
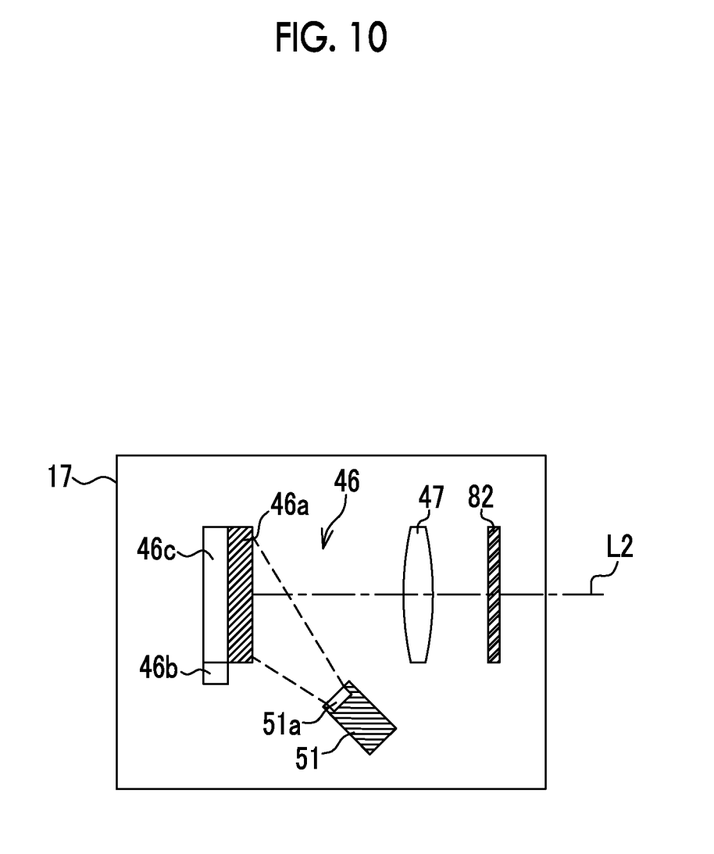
FIG. 10 is a block diagram illustrating a further configuration of the first display section.

As shown in FIG. 10, the illuminance detection sensor 51 may be disposed such that the liquid crystal display device 46 directly faces the light receiving portion 51a without the half mirror 48 and the like. In this case, it is preferable that an observation port 82 is formed as a half mirror so as not to make the outside light incident into the first display section 17. The arrangement shown in FIG. 10 is appropriate for a case of using a self-light-emitting-type display panel, such as an organic EL panel, as the display section of the first display section 17, instead of the liquid crystal display device 46.

The target luminance calculation section 56 may calculate the target luminance by comparing the first threshold value $Th_1$, and may set the subject luminance to the target luminance. Here, the detected subject luminance may be equal to or greater than the first threshold value $Th_1$, and the subject is sufficiently bright. In this case, it is likely to make display visually more comfortable in a case of making the display slightly darker than in a case of making the display luminance of the first display section 17 coincide with the subject luminance. For example, when a user directly views a bright subject, the user may feel dazzled. Even in this case, in display of the first display section 17, the feeling of being dazzled is suppressed. Further, eye fatigue is also reduced. Hence, as described above, it is preferable that the target luminance is determined as compared with the first threshold value $Th_1$.

The subject luminance detection section 38 detects the subject luminance by using the live view image, but the signal processing section 32 may detect the subject luminance by using the imaging signal. In this case, the signal processing section 32 functions as the subject luminance detection section.

The subject luminance detection section 38 respectively detects the subject luminances from a plurality of live view images sequentially generated, but does not necessarily have to detect the subject luminances from all the live view images. For example, among the plurality of live view images sequentially generated at a predetermined frame rate, detection of the subject luminance may be performed on every other image.

The liquid crystal display device is used in the first display section 17 and the second display section 18, but another display device such as an organic EL display may be used in the first display section 17 and the second display section 18.

The image capture lens 12 is a zoom lens, but the configuration of the image capture lens 12 is arbitrary. That is, the image capture lens 12 may be a single focus lens. Further, the image capture lens 12 may be an interchangeable type, and may be fixed.

The imaging devices 10, 60, and 70 are, for example, digital cameras, but the present invention is appropriate for imaging devices, such as a smartphone and a tablet terminal, other than the digital cameras. The smartphone or the like does not have an exclusive electronic view finder such as the first display section 17. Thus, in general, the display such as the second display section 18 functions as an electronic view finder. Hence, in the case of the smartphone or the like, it is not possible to detect the illuminance of the front surface (a surface to be observed by a user) of the electronic view finder by using the half mirror 48. Therefore, it is preferable that, as shown in FIG. 9, the illuminance detection sensor 51 is disposed so as to detect the illuminance of the electronic view finder.

In a smartphone or the like, an operation section is formed of a touch panel provided on the display. However, a method of controlling brightness of the displays functioning as the image sensor 13 and the electronic view finder is the same as that of the embodiment. That is, a method of embodying the operation section 23 is arbitrary, and respective sections of the operation section 23 do not necessarily have to be physical switches and buttons.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging device comprising:
   an image sensor that captures an image of a subject and outputs an imaging signal;
   a display section that displays a live view image, which is generated on the basis of the imaging signal, at a set luminance;
   an illuminance detection sensor that detects an illuminance around the display section;
   a subject luminance detection section that detects a luminance of the subject on the basis of the live view image;
   a target luminance calculation section that calculates a target luminance which is set as a display luminance of the display section on the basis of the luminance of the subject;
   a display luminance detection section that detects an actual display luminance of the display section on the basis of a detected value of the illuminance detection sensor in the case where the target luminance is less than a first value; and
   a corrected luminance calculation section that calculates a corrected luminance which is set in the display section in order to make the actual display luminance close to the target luminance, on the basis of a difference between the target luminance and the actual display luminance of the display section which is set to the target luminance in the case where the target luminance is less than the first value,
   wherein control is performed such that the actual display luminance is made to be close to the target luminance by setting the display luminance of the display section to the target luminance in the case where the target luminance is equal to or greater than the first value and setting the display luminance of the display section to the corrected luminance after setting the display luminance of the display section to the target luminance in the case where the target luminance is less than the first value.

2. The imaging device according to claim 1, further comprising a time integration section that time-integrates the detected value of the illuminance detection sensor, wherein the display luminance detection section detects the actual display luminance on the basis of the time-integrated detected value.

3. The imaging device according to claim 1, further comprising a display gray scale control section that decreases a display gray scale of the display section in the case where the target luminance is less than a second value which is less than the first value.

4. The imaging device according to claim 1, further comprising a correction section that corrects an output value of the illuminance detection sensor on the basis of the luminance of the subject.

5. The imaging device according to claim 4, wherein the correction section outputs a value, which is obtained by dividing the output value of the illuminance detection sensor by a ratio of an average luminance of the subject to a maximum luminance of the subject, as a correction value.

6. The imaging device according to claim 1,
   wherein the display section displays an image for illuminance detection, instead of the live view image, at predetermined timing, and
   wherein the corrected luminance calculation section calculates the corrected luminance on the basis of a difference between the target luminance and the actual display luminance of the display section which is set to the target luminance and on which the image for illuminance detection is displayed.

7. The imaging device according to claim 6, wherein the image for illuminance detection is an image of which a luminance coincides with the luminance of the subject.

8. The imaging device according to claim 1, wherein the display section includes a display device that displays the live view image, an observation port that is used for observing the display device, and a half mirror that passes light of the display device through the observation port and blocks outside light which is incident through the observation port.

9. The imaging device according to claim 8, wherein the half mirror partially reflects light of the display section, and makes the light incident onto the illuminance detection sensor.

10. The imaging device according to claim 8, wherein the illuminance detection sensor is disposed between the half mirror and the display device, and receives the light of the display device without using the half mirror.

11. The imaging device according to claim 1,
    wherein the display section has a display device that is lighted by a backlight, and
    wherein the illuminance detection sensor is mounted on the backlight, and detects an illuminance of the backlight as an illuminance of the display section.

12. An image display method comprising:
    an image capturing step of capturing an image of a subject and outputting an imaging signal by an image sensor;
    a subject luminance detection step of detecting a luminance of the subject by using a live view image generated on the basis of the imaging signal;
    a target luminance calculation step of calculating a target luminance, which is set as a display luminance of a display section displaying the live view image, on the basis of the luminance of the subject;
    a display luminance detection step of detecting an illuminance around the display section, which is set to the target luminance, by an illuminance detection sensor and detecting an actual display luminance of the display section on the basis of the detected illuminance, in the case where the target luminance is less than a first value;

a corrected luminance calculation step of calculating a corrected luminance which is set in the display section in order to make the actual display luminance close to the target luminance, on the basis of a difference between the target luminance and the actual display luminance of the display section which is set to the target luminance, in the case where the target luminance is less than the first value; and a display luminance correction step of performing control such that the actual display luminance is made to be close to the target luminance by setting the display luminance of the display section to the target luminance in the case where the target luminance is equal to or greater than the first value and setting the display luminance of the display section to the corrected luminance after setting the display luminance of the display section to the target luminance in the case where the target luminance is less than the first value.

* * * * *